(12) United States Patent
Zhang et al.

(10) Patent No.: US 11,348,254 B2
(45) Date of Patent: May 31, 2022

(54) VISUAL SEARCH METHOD, COMPUTER DEVICE, AND STORAGE MEDIUM (71) Applicant: BAIDU ONLINE NETWORK TECHNOLOGY (BEIJING) CO., LTD., Beijing (CN)

(72) Inventors: Liuqing Zhang, Beijing (CN); Guohong Li, Beijing (CN); Xin Qiu, Beijing (CN); Shuhui Gao, Beijing (CN); Yazhou Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/041,411

(22) PCT Filed: Jul. 1, 2019

(86) PCT No.: PCT/CN2019/094248
§ 371 (c)(1),
(2) Date: Sep. 24, 2020

(87) PCT Pub. No.: WO2020/103462
PCT Pub. Date: May 28, 2020

(65) Prior Publication Data
US 2021/0012511 A1    Jan. 14, 2021

(30) Foreign Application Priority Data
Nov. 21, 2018    (CN) .......................... 201811392516.X (51) Int. Cl.
G06K 9/00    (2022.01)
G06T 7/223    (2017.01)
(Continued)

(52) U.S. Cl.
CPC ............ *G06T 7/223* (2017.01); *G06F 16/784* (2019.01); *G06F 16/787* (2019.01); *G06V 20/41* (2022.01);
(Continued)

(58) Field of Classification Search
CPC .......... G06T 7/223; G06T 2207/10016; G06T 2207/20084; G06T 2207/30241;
(Continued)

(56) References Cited

U.S. PATENT DOCUMENTS

2010/0201837 A1*  8/2010  Won ................... H04N 5/23219
                                                     348/222.1
2018/0005054 A1*  1/2018  Yu ........................ G06K 9/6293
(Continued)

FOREIGN PATENT DOCUMENTS

CN    104574445 A    4/2015
CN    106683110 A    5/2017
(Continued)

OTHER PUBLICATIONS

Chinese Patent Application No. 201811392516.X Office Action dated Jan. 27, 2021, 10 pages.
(Continued)

Primary Examiner — Stephen P Coleman
(74) Attorney, Agent, or Firm — Lathrop GPM LLP (57) ABSTRACT A visual search method, a computer device, and a non-transitory computer readable storage medium are provided. An $i^{th}$ image frame is received. The location and the classification of the subject in the $i^{th}$ image frame are extracted. A detection block corresponding to the subject is generated. In subsequent image frames of the $i^{th}$ image frame, the subject is tracked on the basis of the location of the subject in the $i^{th}$ image frame. The detection block is adjusted on the basis of the tracking result.

14 Claims, 7 Drawing Sheets (51) Int. Cl.
*G06F 16/783* (2019.01)
*G06F 16/787* (2019.01)
*G06V 20/40* (2022.01)

(52) U.S. Cl.
CPC .... *G06V 20/46* (2022.01); *G06T 2207/10016* (2013.01)

(58) Field of Classification Search
CPC ..... G06T 7/238; G06F 16/784; G06F 16/787; G06F 16/7328; G06F 16/532; G06F 16/583; G06F 16/783; G06F 16/538; G06F 16/738; G06K 9/00718; G06K 9/00744; G06K 9/4652; G06K 2209/21; G06K 9/00711
USPC ......................................................... 382/103
See application file for complete search history.

(56) References Cited

U.S. PATENT DOCUMENTS

| | | | |
|---|---|---|---|
| 2019/0114804 A1* | 4/2019 | Sundaresan | G06K 9/66 |
| 2019/0392212 A1* | 12/2019 | Sawhney | G06K 9/00201 |

FOREIGN PATENT DOCUMENTS

| | | |
|---|---|---|
| CN | 108053427 A | 5/2018 |
| CN | 108154159 A | 6/2018 |
| CN | 108230353 A | 6/2018 |
| CN | 108665476 A | 10/2018 |
| CN | 108764338 A | 11/2018 |
| CN | 108830246 A | 11/2018 |
| JP | H05205052 A | 8/1993 |
| JP | 2010225105 A | 10/2010 |
| JP | 2010231254 A | 10/2010 |
| JP | 2011060167 A | 3/2011 |
| JP | 2016207140 A | 12/2016 |
| WO | WO 2018048353 A1 | 3/2018 |

OTHER PUBLICATIONS

Chinese Patent Application No. 201811392516.X English translation of Office Action dated Jan. 27, 2021, 9 pages.
Zhu, M & Hu, M. "Long-term visual object tracking algorithm based on correlation filter" Journal of Computer Applications; 2017, 37, 5; pp. 1446-1470.
PCT/CN2019/094248 English translation of International Search Report dated Oct. 8, 2019, 2 pages.
PCT/CN2019/094248 International Search Report and Written Opinion dated Oct. 8, 2019, 6 pages.
Korean Patent Application No. 10-2020-7035613, Office Action dated Jan. 20, 2022, 4 pages.
Korean Patent Application No. 10-2020-7035613, English translation of Office Action dated Jan. 20, 2022, 4 pages.
Japanese Patent Application No. 2020-571638, Office Action dated Mar. 1, 2022, 3 pages.
Japanese Patent Application No. 2020-571638, English translation of Office Action dated Mar. 1, 2022, 3 pages.

* cited by examiner

VISUAL SEARCH METHOD, COMPUTER DEVICE, AND STORAGE MEDIUM

CROSS-REFERENCE TO RELATED APPLICATIONS

This application is a U.S. national phase application of International Application No. PCT/CN2019/094248, filed on Jul. 1, 2019, the entire content of which is incorporated herein by reference.

TECHNICAL FIELD

The present disclosure relates to a field of visual search technologies, and more particularly, to a visual search method, a visual search apparatus, a computer device and a storage medium.

BACKGROUND

Visual search is a technology that uses visual contents such as images and videos as search input sources, and applies visual recognition technologies to identify and retrieve the input visual contents, and then returns search results in various forms such as images and texts. With continuous development of visual recognition technologies, more users use visual search technologies on mobile terminals to learn information on surrounding objects.

SUMMARY

Embodiments of the present disclosure provide a visual search method. The includes: receiving an $i^{th}$ image frame, i being a positive integer; extracting a location and a classification of a subject in the $i^{th}$ image frame, and generating a detection block corresponding to the subject; and in subsequent image frames of the $i^{th}$ image frame, tracking the subject according to the location of the subject in the $i^{th}$ image frame, and adjusting the detection block according to a tracking result.

Embodiments of the present disclosure provide a computer device. The computer device includes a processor and a memory. The processor runs programs corresponding to executable program codes by reading the executable program codes stored in the memory, to implement the method described above.

Embodiments of the present disclosure provide a non-transitory computer-readable storage medium, having computer programs stored thereon. When the programs are executed by a processor, the method described above.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The accompanying drawings provides further descriptions on the present disclosure, which constitute a part of this description, serve to explain the principles of the present disclosure together with the description, and do not constitute a limitation on the present disclosure. In the drawings.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A visual search method, a visual search apparatus, a computer device, and a storage medium according to embodiments of the present disclosure will be described below with reference to the drawings.

The existing visual search product have the following defects.

(1) The operation process is cumbersome. When a user uses a mobile terminal to perform the visual search, the user needs to activate a camera and cause the camera to focus on a target subject to obtain and save the image in an album of the mobile terminal. The user also needs to select an image from the album such that the selected image is uploaded to a visual search server via network for the visual search.

(2) Time required by the visual search is long. The image used for the visual search needs to be transmitted to the visual search server via the network. After the subject is detected and recognized from the image by the visual search server, the location of the subject and the recognition result are sent to the mobile terminal.

(3) Only a single subject in the image could be recognized.

(4) It is unable to recognize the subject in the real-time video stream or to track subsequently the object in the real-time video stream.

Figure 1:
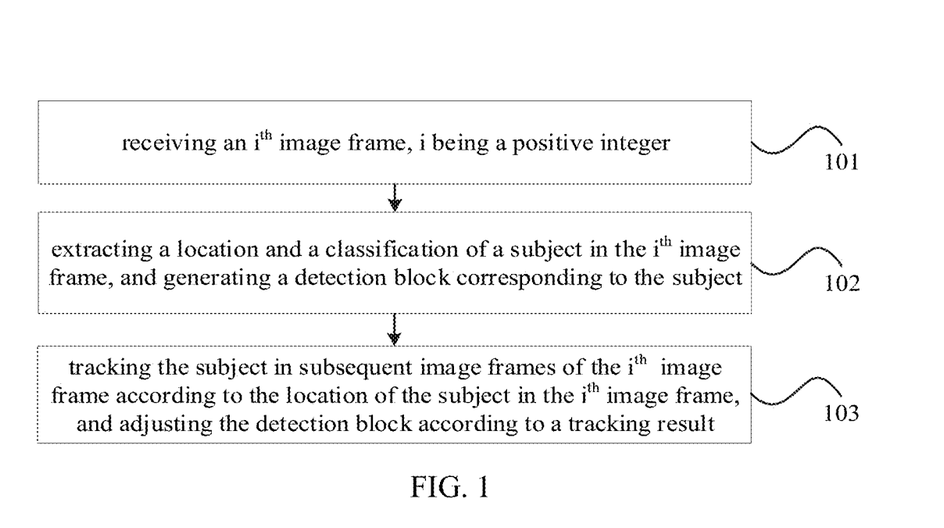
FIG. 1 is a flowchart illustrating a visual search method according to an embodiment of the present disclosure.

In order to solve at least one of the above-mentioned problems in the existing visual search products, the present disclosure provides a visual search method. FIG. 1 is a flowchart illustrating a visual search method according to an embodiment of the present disclosure. This method is applicable to mobile terminals, such as mobile phones, tablet computers, and notebook computers.

As illustrated in FIG. 1, the visual search method may include the following.

In block 101, an $i^{th}$ image frame is obtained, where i is a positive integer.

The $i^{th}$ image frame is a frame contained in the real-time video stream.

When the user wants to obtain information on a surrounding object, the user could obtain the information of the surrounding object through visual search function of the mobile terminal. The mobile terminal activates the camera to collect a video stream of the surrounding object and obtains the $i^{th}$ image frame from the video stream, where i is a positive integer.

When the user wants to obtain information of multiple objects, the user may collect a video stream containing the multiple objects. When collecting the video stream, the user only needs to activate the camera and make the camera to focus on the target object, without manually operating the shooting button or selecting images from the album and uploading the images, which simplifies the operation process of the visual search.

In block 102, a location and a classification of a subject in the $i^{th}$ image frame are extracted, and a detection block corresponding to the subject is generated.

In some embodiments, after receiving the $i^{th}$ image frame, detection and recognition may be performed on the $i^{th}$ image frame to extract the location and classification of the subject in the $i^{th}$ image frame, and the detection block corresponding to the subject is generated.

In an implementation of embodiments of the present disclosure, the mobile terminal may perform the detection on the received $i^{th}$ image frame using an object detection model based on deep learning. After related parameters of the object detection model are configured, the received $i^{th}$ image frame is input into the object detection model to detect the subject contained in the $i^{th}$ image frame, and output the location of the subject in the $i^{th}$ image frame.

When the mobile terminal performs the recognition on the $i^{th}$ image frame, a suitable recognition algorithm may be selected based on the subject contained in the $i^{th}$ image frame. When the subject contained in the $i^{th}$ image frame is a two-dimensional code, the two-dimensional code recognition algorithm may be called. When the subject contained in the $i^{th}$ image frame is a plant or an animal, object classification and recognition algorithm may be called.

In an implementation, the mobile terminal may apply a subject classification model based on deep learning to recognize the subject contained in the $i^{th}$ image frame. After configuring the related parameters of the subject classification model, the received $i^{th}$ image frame is input into the subject classification model, such that the subject classification model may classify and recognize the subject contained in the $i^{th}$ image frame to output the classification of the subject contained in the $i^{th}$ image frame. The classification includes the recognition result of the subject.

By detecting and recognizing the subject contained in the $i^{th}$ image frame by the mobile terminal, data exchange between the mobile terminal and the server may be avoided, thereby reducing waiting time and reducing consumed time.

After detecting the subject contained in the $i^{th}$ image frame to obtain the location of the subject and recognizing the subject to obtain the classification of the subject, the detection block corresponding to the subject may be generated according to the location and classification of the subject. The detection block carries the recognition result of the subject.

In an implementation of embodiments of the present disclosure, multiple subjects are contained in the image frame and multiple detection blocks are generated. In the video stream collected by the mobile terminal, the $i^{th}$ image frame may include multiple subjects. With the object detection model based on deep learning and the subject classification model based on deep learning, the multiple subjects contained in the $i^{th}$ image frame may be detected and recognized at the same time. For each subject, the detection block corresponding to the subject may be generated according to the location and classification of the subject. Consequently, the multiple subjects contained in an image could be recognized simultaneously, thereby improving the efficiency of the visual search and solving the problem that only a single subject could be recognized in the related art.

In block 103, in subsequent image frames of the $i^{th}$ image frame, the subject is tracked according to the location of the subject in the $i^{th}$ image frame, and the detection block is adjusted according to a tracking result.

The video stream contains multiple image frames. When the $i^{th}$ image frame is not a last frame of the video stream, at least one subsequent frame may be contained after the $i^{th}$ image frame. Therefore, in some embodiments, according to the location of the subject in the $i^{th}$ image frame, the subject may be tracked in the subsequent image frames of the $i^{th}$ image frame, and the detection block may be adjusted according to the tracking result.

For example, according to the location of the subject in the $i^{th}$ image frame, a related target tracking algorithm is applied to track the location of the subject in the subsequent image frames of the $i^{th}$ image frame. When the subject is tracked in the subsequent image frames, the detection block is adjusted according to the location of the tracked subject, that is, the tracking result.

For example, a tracking algorithm based on target detection may be applied to perform target detection on the received subsequent image frames. The detected location of the subject is compared with the location of the subject in the $i^{th}$ image frame. When the two locations are inconsistent to each other, the detection block is adjusted according to the location of the subject in the subsequent image frames.

In a possible implementation of embodiments of the present disclosure, when multiple subjects are contained in the $i^{th}$ image frame, unique identifiers may be used as identification identifiers of the multiple subjects to distinguish different subjects. When the subject is tracked, the subjects are tracked according to the identification identifiers, and the detection blocks corresponding to the subjects are adjusted.

With the visual search method of embodiments of the present disclosure, the location and classification of the subject are extracted in the $i^{th}$ image frame by receiving the $i^{th}$ image frame, and the detection block corresponding to the subject is generated. In the subsequent image frames of the $i^{th}$ image frame, the subject is tracked according to the location of the subject in the $i^{th}$ image frame, and the detection block is adjusted according to the tracking result. Thus, by tracking the subject in subsequent frames according to the position of the subject in the $i^{th}$ image frame, and adjusting the detection block according to the tracking result, the tracking of the subject in the video stream is realized and the continuity of visual search is improved.

Figure 2:
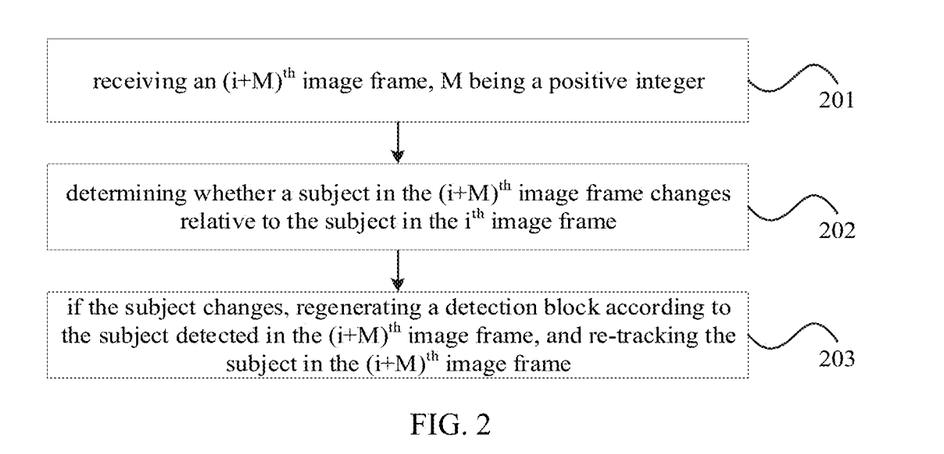
FIG. 2 is a flowchart illustrating another visual search method according to an embodiment of the present disclosure.

The video stream contains multiple image frames. The image frames may include different subjects. Even if the change of subject occurs in the video stream, in order to keep identifying and tracking the subjects, the present disclosure provides another visual search method. FIG. 2 is a flowchart illustrating another visual search method according to embodiments of the present disclosure.

As illustrated in FIG. 2, on the basis of FIG. 1, the visual search method may further include the following.

In block 201, an $(i+M)^{th}$ image frame is received, where M is a positive integer.

While performing subject recognition and tracking on the video stream by the mobile terminal, the mobile terminal continuously obtains the image frames contained in the video stream.

In block 202, it is determined whether a subject in the $(i+M)^{th}$ image frame changes relative to the subject in the $i^{th}$ image frame.

In block 203, in response to changing, a detection block is regenerated according to the subject detected in the $(i+M)^{th}$ image frame, and the subject in the $(i+M)^{th}$ image frame is re-tracked.

In embodiments of the present disclosure, the mobile terminal receives the $i^{th}$ image frame and detects and recognizes the subject in the $i^{th}$ image frame. During the detection and recognition, the mobile terminal continuously obtains subsequent image frames after the $i^{th}$ image frame. For the received $(i+M)^{th}$ image frame, the mobile terminal performs subject detection and recognition on the $(i+M)^{th}$ image frame and compares the subject recognized in the $(i+M)^{th}$ image frame with the subject in the $i^{th}$ image frame to determine whether the subject in the $(i+M)^{th}$ image frame changes relative to the subject in the $i^{th}$ image frame.

In response to that the subject in the $(i+M)^{th}$ image frame changes relative to the subject in the $i^{th}$ image frame, the detection block is regenerated based on the subject detected in the $(i+M)^{th}$ image frame, and the subject is re-tracked.

In detail, when at least one subject in the $(i+M)^{th}$ image frame is different from the subject in the $i^{th}$ image frame, according to the location of the subject obtained by detecting the subject in the $(i+M)^{th}$ image frame and the classification of the subject obtained by recognizing the subject, the detection block corresponding to the subject is regenerated in the $(i+M)^{th}$ image frame and the subject is tracked in the subsequent image frames of the $(i+M)^{th}$ image frame.

With the visual search method according to embodiments of the present disclosure, by determining whether the subject in the received $(i+M)^{th}$ image frame changes relative to the subject in the $i^{th}$ image frame, in response to the change, the detection block is regenerated according to the subject detected in the $(i+M)^{th}$ image frame and the subject is re-tracked. Thus, the recognition and tracking of a new subject is realized when the new subject appears in the video stream, thereby improving the user experience.

In order to clearly describe the implementation process of tracking the subject in the foregoing embodiments, the present disclosure provides another visual search method.

Figure 3:
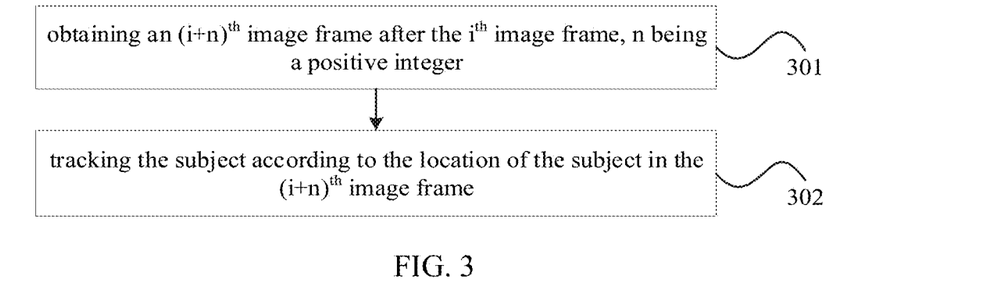
FIG. 3 is a flowchart illustrating yet another visual search method according to an embodiment of the present disclosure.

FIG. 3 is a flowchart illustrating another visual search method according to embodiments of the present disclosure.

As illustrated in FIG. 3, on the basis of FIG. 1, the block 103 may include the following.

In block 301, an $(i+n)^{th}$ image frame after the $i^{th}$ image frame is obtained, where n is a positive integer.

In block 302, the subject is tracked according to the location of the subject in the $(i+n)^{th}$ image frame.

In embodiments of the present disclosure, after the mobile terminal receives the $i^{th}$ image frame, in the process of performing the subject detection and recognition on the $i^{th}$ image frame, the image frames after the $i^{th}$ image frame are also acquired. The mobile terminal detects and recognizes the subject of the received $(i+n)^{th}$ image frame in turn to obtain the location and classification of the subject in the $(i+n)^{th}$ image frame and tracks the subject according to the location of the subject in the $(i+n)^{th}$ image frame.

Since the mobile terminal continuously acquires subsequent image frames of the $i^{th}$ image frame when performing the subject detection and recognition on the $i^{th}$ image frame, when tracking the subject in the subsequent image frames, the tracking is performed according to the location of the subject detected in the $i^{th}$ image frame and the tracking is initialized according to the location of the subject in the $i^{th}$ image frame. Therefore, it is possible that the location of the subject in the $i^{th}$ image frame is not obtained by the subject detection when the mobile terminal receives the $(i+n-1)^{th}$ image frame. In this case, subject tracking cannot be performed on the image frames between the $(i+1)^{th}$ image frame and the $(i+n-1)^{th}$ image frame.

In a possible implementation of embodiments of the present disclosure, the image frames between the $(i+1)^{th}$ image frame and the $(i+n-1)^{th}$ image frame may be obtained as reference image frames, and the subject tracking is verified according to the reference image frames. For example, a variation range of the location of the subject in the $(i+n)^{th}$ image frame relative to the location of the subject in the $(i+n-1)^{th}$ image frame is compared with a variation range of the location of the subject in the $(i+n-1)^{th}$ image frame relative to the location of the subject in the $(i+n-2)^{th}$ image frame to determine whether a difference is within an allowable error range. If the difference is within the allowable error range, it is determined that the subject tracking is accurate. As a result, the accuracy of the subject tracking may be improved.

In the visual search method of embodiments of the present disclosure, by acquiring the $(i+n)^{th}$ image frame after the $i^{th}$ image frame, the subject is tracked in the $(i+n)^{th}$ image frame according to the location of the subject, thereby improving the consistency of visual search.

Figure 4:
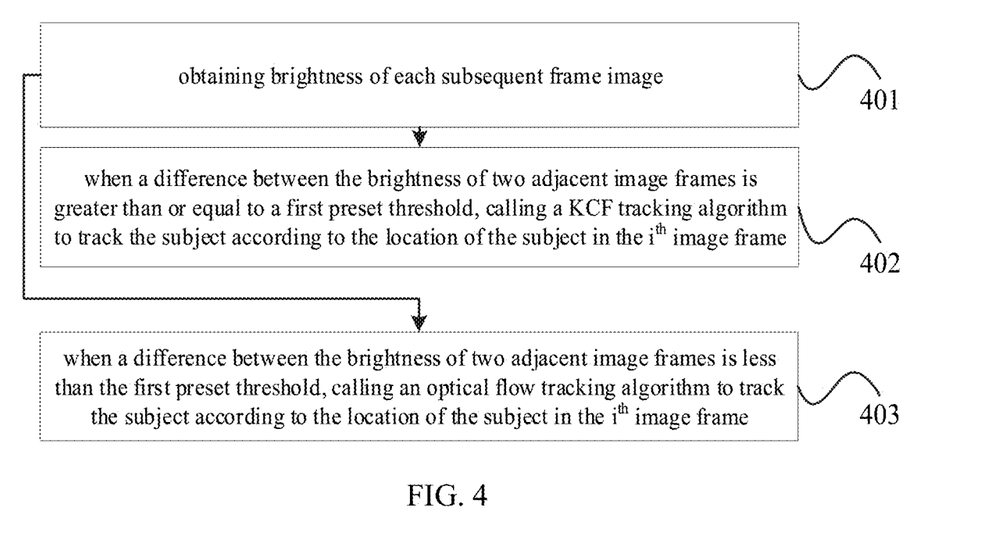
FIG. 4 is a flowchart illustrating still another visual search method according to an embodiment of the present disclosure.

In order to clearly describe the specific implementation process of tracking the subject in the foregoing embodiments, the present disclosure provides another visual search method. FIG. 4 is a flowchart illustrating another visual search method according to embodiments of the present disclosure.

As illustrated in FIG. 4, on the basis of FIG. 1, the block 103 may include the following.

In block 401, brightness of each subsequent image frame is obtained.

In some embodiments, after the subsequent image frames of the $i^{th}$ image frame are obtained, the brightness of each subsequent image frame is obtained.

The brightness of the image is the brightness of each pixel of the image. The brightness of each pixel is values of RGB channels. When the values of RGB channels are all 0, the pixel point is black and has the lowest brightness. When the values of RGB channels are all 255, the pixel point is white and has the highest brightness. Therefore, in embodiments, for the received subsequent image frames, the pixel values of the image may be obtained as the brightness of the image.

In block 402, when a difference between the brightness of two adjacent image frames is greater than or equal to a first preset threshold, a KCF (Kernelized Correlation Filters) tracking algorithm is called to track the subject according to the location of the subject in the $i^{th}$ image frame.

In block 403, when the difference between the brightness of two adjacent image frames is less than the first preset threshold, an optical flow tracking algorithm is called to track the subject according to the location of the subject in the $i^{th}$ image frame.

The first preset threshold may be determined in advance.

In some embodiments, every time an image frame is received, the brightness of the image frame is obtained and saved. The brightness of the current image frame is compared with the brightness of a previous image frame to obtain the difference between brightness of the two image frames. When the difference between the brightness of the two adjacent image frames is greater than or equal to the first preset threshold, the KCF tracking algorithm is called to track the subject according to the location of the subject in the $i^{th}$ image frame.

The KCF tracking algorithm uses circulant matrixes of the ambient area of the subject to collect positive and negative samples, applies ridge regression to train a target detector, and uses the diagonalization property of the circulant matrixes in Fourier space to convert the calculation of the matrixes into dot product of the elements, thereby greatly reducing the amount of calculation, increasing the speed of calculation, so that the algorithm meets the requirement of real time.

When the difference between the brightness of the two adjacent image frames is less than the first preset threshold, the optical flow tracking algorithm is called to track the subject according to the location of the subject in the $i^{th}$ image frame.

The principle of the optical flow tracking algorithm is as follows. A sequence of continuous video frames is processed. A certain target detection method is applied on the sequence to detect possible foreground targets. If a foreground target is detected from a video frame, representative key feature points (which can be randomly generated or corner points) are found. For any two adjacent video frames after the above-mentioned video frame, in each of the two adjacent video frames, best locations of the key feature points of the previous video frame are found, so as to obtain the coordinates of the foreground target in the current frame. The above operations are iterated to realize the target tracking. The optical flow tracking algorithm is suitable for the target tracking when the light intensity is low.

With the visual search method according to embodiments of the present disclosure, brightness of the subsequent image frames is obtained. When the difference between the brightness of the two adjacent image frames is greater than or equal to a first preset threshold, the KCF tracking algorithm is called to track the subject according to the location of the subject in the $i^{th}$ image frame. When the difference between the brightness of the two adjacent image frames is less than the first preset threshold, the optical flow tracking algorithm is called to track the subject according to the location of the subject in the $i^{th}$ image frame.

Figure 5:
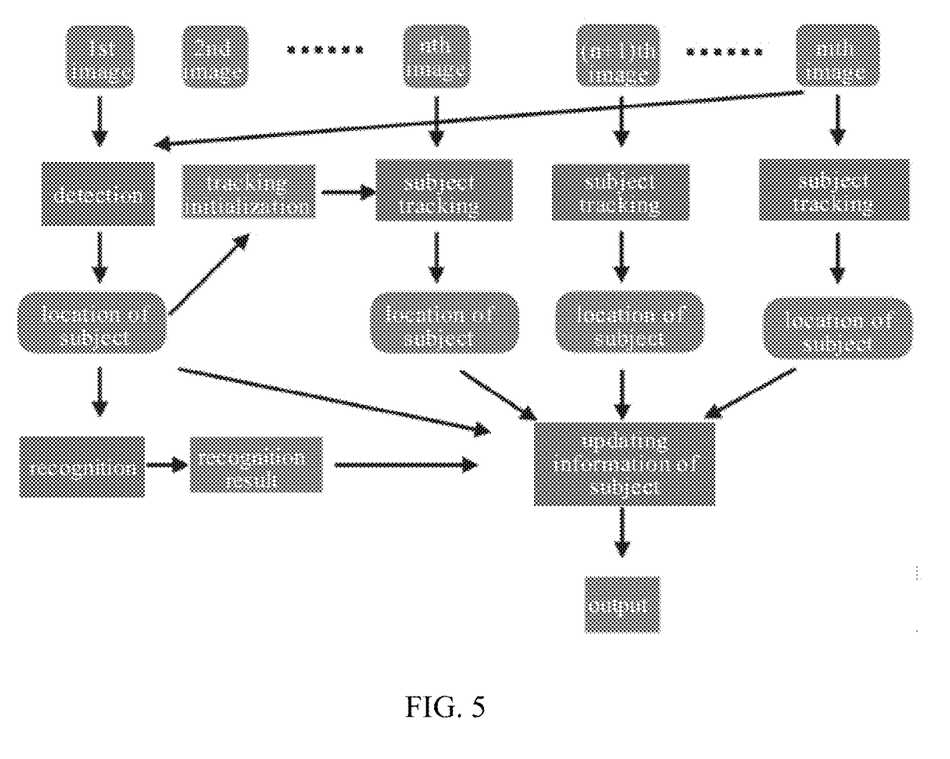
FIG. 5 is a schematic diagram illustrating implementations of a visual search method according to an embodiment of the present disclosure.
Figure 6:
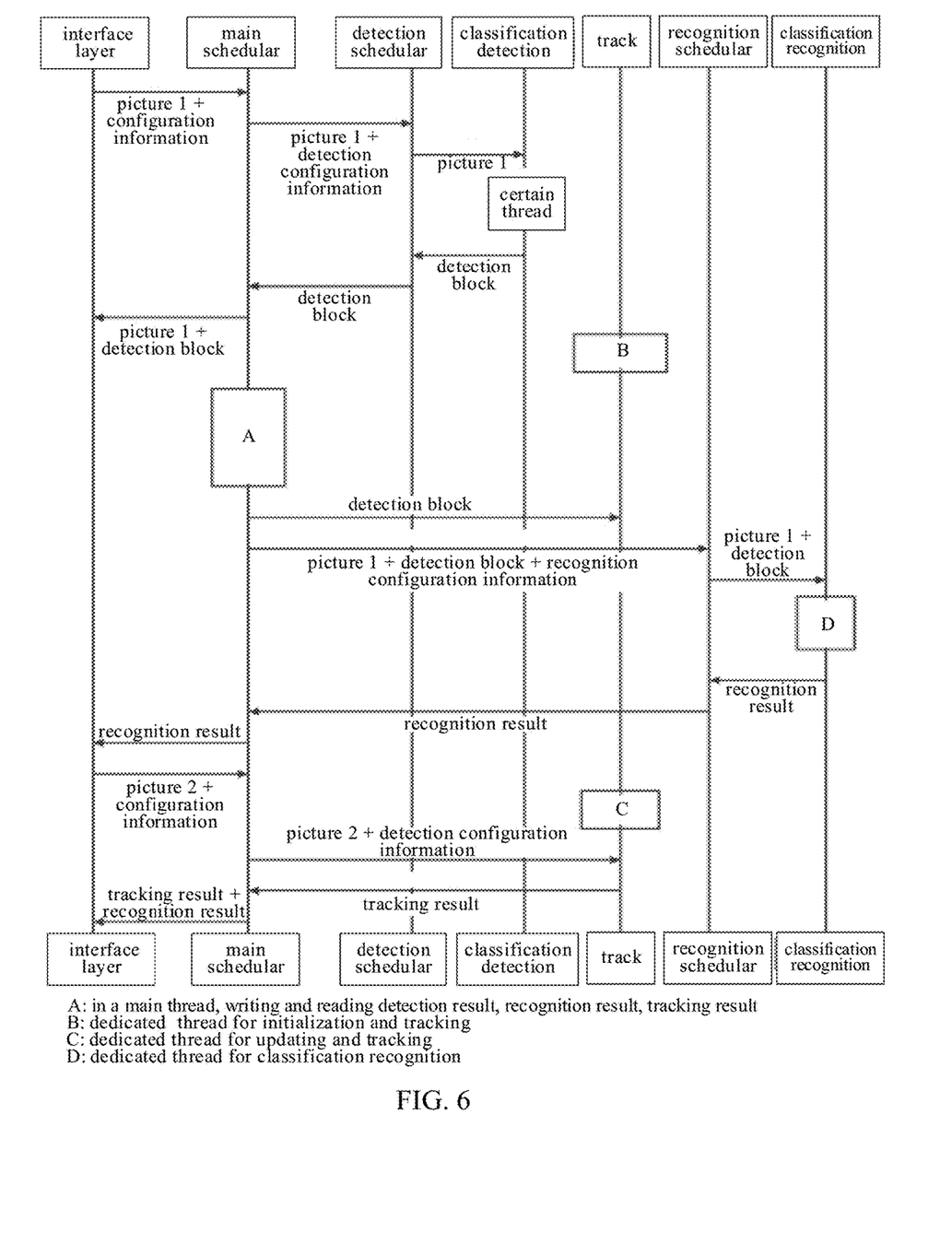
FIG. 6 is a timing diagram of a single image frame for visual search.

FIG. 5 is a schematic diagram illustrating implementations of a visual search method according to embodiments of the present disclosure. FIG. 6 is a timing diagram of a single image frame of visual search.

As illustrated in FIG. 5, the subject detection is performed on the first image to obtain the location of the subject. During the subject detection, tracking initialization is not performed. Therefore, the second image to the $(n-1)^{th}$ image are not used for the subject tracking. These images could be used for verifying the subject tracking. After completion of the subject detection on the first image, the acquired location of the subject is stored in the memory according to the identification identifier. That is, subject information is updated and tracking initialization is performed according to the location of the subject. In response to receiving the $n^{th}$ image, the tracking initialization is completed at this time, the subject tracking is performed on the $n^{th}$ image the subsequent images until the subject detection is performed again (for example, the subject detection is performed on the $m^{th}$ image illustrated in FIG. 5) and the tracking initialization is performed again according to the new detection result. After the subject tracking is completed, the location of the subject is updated and the location of the subject stored in the memory is updated according to the identification identifier. The subject is selected and framed by the mobile terminal according to the location of the subject and the subject is recognized, for example, the classification of the subject is recognized, the text is recognized, the two-dimensional code is recognized. When the recognition is completed, the recognition result is stored in the memory according to the identification identifier. Every time information of the subject (including the location of the subject and the recognition result) in the memory is updated, the mobile terminal renders the image on a viewing interface of the video stream according to the updated information of the subject, such that the location of the subject and the recognition result of the subject are displayed for the corresponding subject in a form of the detection block to achieve the purpose of visual search.

As illustrated in FIG. 6, for a picture 1, an appropriate detection method is selected and applied to detect the subject according to the detection configuration information to obtain the location of the subject. The location of the subject is fed back to an interface layer in the form of the detection block. That is, the location of the subject is selected in the picture 1. An appropriate recognition method is selected according to the recognition configuration information and applied to perform the subject recognition on the subject selected by the detection block in the picture 1. The recognition result is fed back to the interface layer by a main scheduler. That is, the recognition result corresponding to the subject is displayed on the picture 1. For the picture 2, an appropriate tracking method is selected according to the detection configuration information and applied to track the subject of picture 2 according to the location of the subject in picture 1. The tracking result is fed back to the interface layer by the main scheduler. The tracking result and the recognition result are displayed on the picture 2.

In order to implement the above embodiments, the present disclosure also provides a visual search apparatus.

Figure 7:
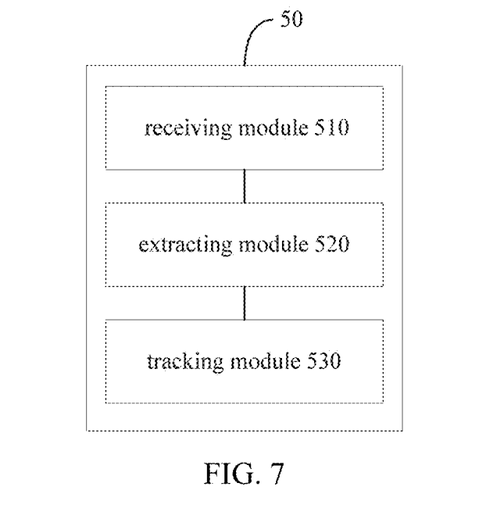
FIG. 7 is a block diagram illustrating of a visual search apparatus according to an embodiment of the present disclosure.

FIG. 7 is a block diagram illustrating a visual search apparatus according to embodiments of the present disclosure.

As illustrated in FIG. 7, the visual search apparatus 50 includes a receiving module 510, an extracting module 520, and a tracking module 530.

The receiving module 510 is configured to receive an $i^{th}$ image frame, where i is a positive integer.

The extracting module 520 is configured to extract a location and a classification of a subject in the $i^{th}$ image frame, and generate a detection block corresponding to the subject.

In a possible implementation of embodiments of the present disclosure, multiple subjects are contained and multiple detection blocks are generated.

The tracking module 530 is configured to track the subject in subsequent image frames of the $i^{th}$ image frame according to the location of the subject in the $i^{th}$ image frame, and adjust the detection block according to a tracking result.

Figure 8:
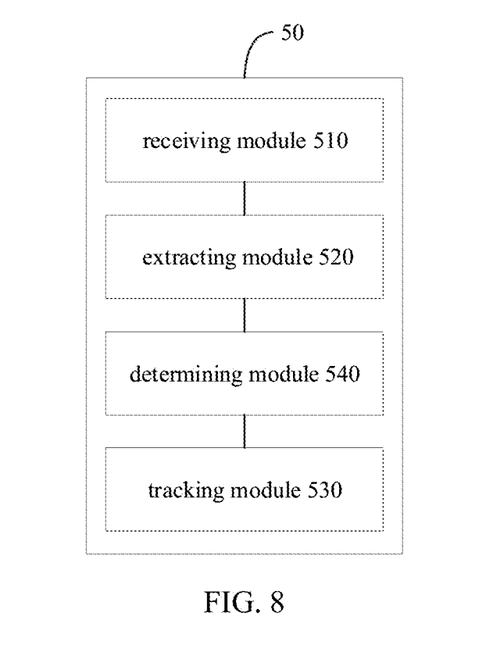
FIG. 8 is a schematic diagram illustrating another visual search apparatus according to an embodiment of the present disclosure.

In a possible implementation of embodiments of the present disclosure, as illustrated in FIG. 8, on the basis of FIG. 7, the visual search apparatus 50 further includes a determining module 540.

The determining module 540 is configured to determine whether a subject in the $(i+M)^{th}$ image frame changes relative to the subject in the $i^{th}$ image frame, where M is a positive integer.

In some embodiments, when the receiving module 510 receives the $(i+M)^{th}$ image frame, the extracting module 520 is configured to extract the location and the classification of the subject in the $(i+M)^{th}$ image frame. The determining module 540 is configured to determine whether the subject in the $(i+M)^{th}$ image frame changes relative to the subject in the $i^{th}$ image frame. The extracting module 520 is configured to regenerate the detection block according to the subject detected in the $(i+M)^{th}$ image frame if the subject in the $(i+M)^{th}$ image frame changes relative to the subject in the $i^{th}$ image frame. The tracking module 530 is configured to re-track the subject in the $(i+M)^{th}$ image frame.

By determining whether the subject in the $(i+M)^{th}$ image frame changes relative to the subject in the $i^{th}$ image frame, the detection block is regenerated according to the subject detected in the $(i+M)^{th}$ image frame, if there is the change, and the subject is re-tracked. Therefore, when a new subject appears in the video stream, the recognition and tracking of the new subject is realized, thereby improving the user experience.

Figure 9:
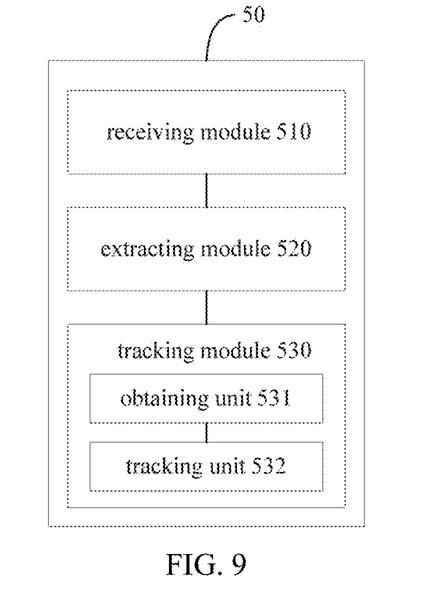
FIG. 9 is a schematic diagram illustrating yet another visual search apparatus according to an embodiment of the present disclosure.

In a possible implementation of embodiments of the present disclosure, as illustrated in FIG. 9, on the basis of FIG. 7, the tracking module 530 includes an obtaining unit 531 and a tracking unit 532.

The obtaining unit 531 is configured to obtain brightness of each subsequent image frame.

The tracking unit 532 is configured to, when a difference between the brightness of two adjacent image frames is greater than or equal to a first preset threshold, call a KCF tracking algorithm to track the subject according to the location of the subject in the $i^{th}$ image frame.

The tracking unit 532 is further configured to, when the difference between the brightness of two adjacent image frames is less than the first preset threshold, call an optical flow tracking algorithm to track the subject according to the location of the subject in the $i^{th}$ image frame.

After obtaining the brightness of the subsequent image frames, when the difference between the brightness of two adjacent image frames is greater than or equal to the first preset threshold, the KCF tracking algorithm is called to track the subject according to the location of the subject in the $i^{th}$ image frame, and when the difference between the brightness of two adjacent image frames is less than the first preset threshold, the optical flow tracking algorithm is called to track the subject according to the location of the subject in the $i^{th}$ image frame. Therefore, the accuracy and precision of the subject tracking are improved and the subject tracking effect is improved.

Figure 10:
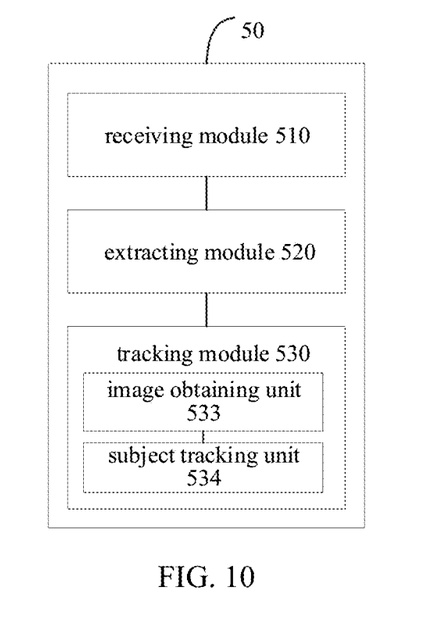
FIG. 10 is a schematic diagram illustrating still another visual search apparatus according to an embodiment of the present disclosure.

In a possible implementation of embodiments of the present disclosure, as illustrated in FIG. 10, on the basis of FIG. 7, the tracking module 530 includes an image obtaining unit 533 and a subject tracking unit 534.

The image obtaining unit 533 is configured to obtain an $(i+n)^{th}$ image frame after the $i^{th}$ image frame, where n is a positive integer.

The subject tracking unit 534 is configured to track the subject according to the location of the subject in the $(i+n)^{th}$ image frame.

Further, in a possible implementation of embodiments of the present disclosure, the image obtaining unit 533 is further obtain image frames between an $(i+1)^{th}$ image frame and an $(i+n-1)^{th}$ image frame as reference image frames. The subject tracking unit 534 is further configured to verify the tracking of the subject according to the reference image frames.

It should be noted that the foregoing explanation of the embodiment of the visual search method is also applicable for the visual search apparatus of this embodiment, and the implementation principle is similar, which is not repeated herein.

With the visual search apparatus of this embodiment, by receiving the $i^{th}$ image frame, extracting the location and the classification of the subject in the $i^{th}$ image frame, and generating the detection block corresponding to the subject, the subject is tracked in subsequent image frames of the $i^{th}$ image frame according to the location of the subject in the $i^{th}$ image frame, and the detection block is adjusted according to the tracking result. Thus, by tracking the subject in the subsequent frames according to the location of the subject in the $i^{th}$ image frame, and adjusting the detection block according to the tracking result, the tracking of the subject in the video stream is realized and the continuity of visual search is improved.

In order to implement the above embodiments, the present disclosure also provides a computer device, including a processor and a memory. The processor runs a program corresponding to an executable program code by reading the executable program code stored in the memory, so as to implement the visual search method described in the above embodiments.

Figure 11:
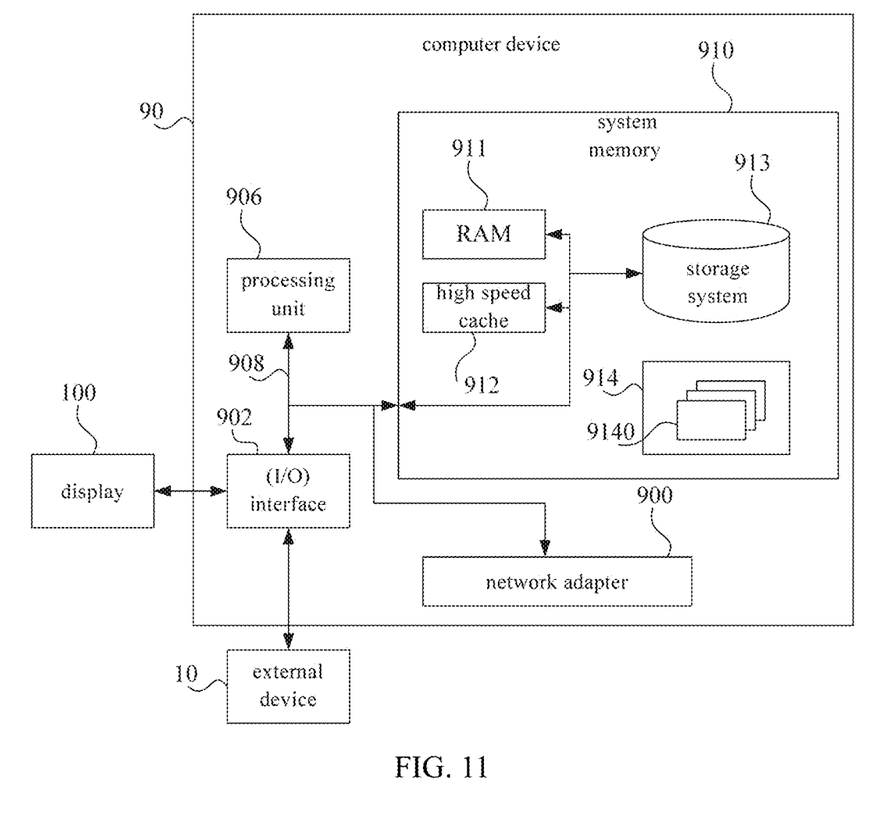
FIG. 11 is a schematic diagram illustrating a computer device according to an embodiment of the present disclosure.

FIG. 11 is a schematic diagram illustrating a computer device according to embodiments of the disclosure, which illustrates a block diagram of an exemplary computer device 90 suitable for implementing embodiments of the present disclosure.

The computer device 90 illustrated in FIG. 11 is only an example, and should not bring any limitation to the function and scope of use of the embodiments of the present disclosure.

As illustrated in FIG. 11, the computer device 90 may be represented via a general computer device form. Components of the computer device 90 may include but be not limited to one or more processors or processing units 906, a system memory 910, a bus 908 connecting various system components including the system memory 910 and the processing units 906.

The bus 908 represents one or more of several classifications of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 90 typically includes a variety of computer system readable media. These media may be any available media accessible by the computer device 90 and includes both volatile and non-volatile media, removable and non-removable media.

The system memory 910 may include a computer system readable medium in the form of volatile memory, such as a random access memory (hereinafter referred to as RAM)

911 and/or a high speed cache memory 912. The computer device 90 may further include other removable or non-removable, volatile or non-volatile computer system storage media. By way of example only, the storage system 913 may be configured to read and write a non-removable and non-volatile magnetic media (not shown in FIG. 11, commonly referred to as a "hard drive"). Although not shown in FIG. 11, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 908 via one or more data medium interfaces. The memory 901 may include at least one program product. The program product has a set (such as, at least one) of program modules configured to perform the functions of various embodiments of the present disclosure.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a combination thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server.

A program/utility 914 having a set (at least one) of the program modules 9140 may be stored in, for example, the memory 910. The program modules 9140 include but are not limited to, an operating system, one or more application programs, other programs modules, and program data. Each of these examples, or some combination thereof, may include an implementation of a network environment. The program modules 9140 generally perform the functions and/or methods in the embodiments described herein.

The computer device 90 may also communicate with one or more external devices 10 (such as, a keyboard, a pointing device, a display 100, etc.). Furthermore, the computer device 90 may also communicate with one or more communication devices enabling a user to interact with the computer device 90 and/or other devices (such as a network card, modem, etc.) enabling the computer device 90 to communicate with one or more computer devices. This communication can be performed via the input/output (I/O) interface 902. Also, the computer device 90 may communicate with one or more networks (such as a local area network (hereafter referred to as LAN), a wide area network (hereafter referred to as WAN) and/or a public network such as an Internet) through a network adapter 900. As shown in FIG. 11, the network adapter 900 communicates with other modules of the computer device 90 over the bus 908. It should be understood that, although not shown in FIG. 11, other hardware and/or software modules may be used in connection with the computer device 90. The hardware and/or software includes, but is not limited to, microcode, device drivers, redundant processing units, external disk drive arrays, RAID systems, tap drive and data backup storage system.

The processing unit 906 is configured to execute various functional applications and data processing by running programs stored in the system memory 910, for example, implementing the visual search method according to the above embodiments.

In order to implement the foregoing embodiments, the present disclosure also provides a non-transitory computer-readable storage medium on which a computer program is stored, and when the program is executed by a processor, the visual search method as described in the foregoing embodiment is implemented.

In order to implement the above-mentioned embodiments, the present disclosure also provides a computer program product. When the instructions in the computer program product are executed by a processor, the visual search method as described in the preceding embodiments is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure.

Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process. The scope of a preferred embodiment of the present disclosure includes other implementations, including performing functions in another order that is different from the illustrated and discussed order, for example, performing the functions in an essential simultaneous order or in a reverse order, which should be understood by the skilled person in the art.

The logic and/or step described in other manners herein or shown in the flowchart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to (a non-exhaustive list): an electronic connection (an electronic device) with one or more wires, a portable computer enclosure (a magnetic device), a random access memory (RAM), a read only memory (ROM), an erasable programmable read-only memory (EPROM or a flash memory) and an optical fiber device. In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for video searching, comprising:
receiving an $i^{th}$ image frame, i being a positive integer;
extracting a location and a classification of a subject in the $i^{th}$ image frame, and generating a detection block corresponding to the subject;
obtaining an $(i+n)^{th}$ image frame after the $i^{th}$ image frame, where n is a positive integer;
tracking the subject according to the location of the subject in the $(i+n)^{th}$ image frame;
obtaining image frames between an $(i+1)^{th}$ image frame and an $(i+n-1)^{th}$ image frame as reference image frames;
verifying the tracking of the subject according to the reference image frames, comprising:
for each pair of two adjacent reference image frames, determining a variation range of the location of the subject between the two adjacent reference image frames; comparing the variation ranges corresponding to adjacent pairs to determine a difference; and determining whether the difference is within an allowable error range;
and
adjusting the detection block according to a tracking result.

2. The method according to claim 1, further comprising:
receiving an $(i+M)^{th}$ image frame, M being a positive integer;
determining whether a subject in the $(i+M)^{th}$ image frame changes relative to the subject in the $i^{th}$ image frame; and
in response to changing, regenerating a detection block according to the subject detected in the $(i+M)^{th}$ image frame, and re-tracking the subject in the $(i+M)^{th}$ image frame.

3. The method according to claim 1, wherein in the subsequent image frames of the $i^{th}$ image frame, tracking the subject according to the location of the subject in the $i^{th}$ image frame comprises:
obtaining brightness of each subsequent image frame;
in response to determining that a difference between the brightness of two adjacent image frames is greater than or equal to a first preset threshold, calling a kernelized correlation filters tracking algorithm to track the subject according to the location of the subject in the $i^{th}$ image frame; and
in response to determining that a difference between the brightness of two adjacent image frames is less than the first preset threshold, calling an optical flow tracking algorithm to track the subject according to the location of the subject in the $i^{th}$ image frame.

4. The method according to claim 1, further comprising:
determining whether the location of the subject in one subsequent image frame is different from the location of the subject in the $i^{th}$ image frame;
in response to determining that the location of the subject in the subsequent image frame is different from the location of the subject in the $i^{th}$ image frame, adjusting the detection block according to the location of the subject in the subsequent image frame.

5. The method according to claim 1, wherein a plurality of subjects are comprised and a plurality of detection blocks are generated.

6. The method according to claim 5, wherein the plurality of subjects have respective unique identification identifiers.

7. A computer device, comprising a processor and a memory, wherein the processor runs programs corresponding to executable program codes by reading the executable program codes stored in the memory, to
receive an $i^{th}$ image frame, i being a positive integer;

extract a location and a classification of a subject in the $i^{th}$ image frame, and generate a detection block corresponding to the subject;

obtain an $(i+n)^{th}$ image frame after the $i^{th}$ image frame, where n is a positive integer;

track the subject according to the location of the subject in the $(i+n)^{th}$ image frame;

obtain image frames between an $(i+1)^{th}$ image frame and an $(i+n-1)^{th}$ image frame as reference image frames;

verify the tracking of the subject according to the reference image frames, by:
  for each pair of two adjacent reference image frames, determining a variation range of the location of the subject between the two adjacent reference image frames; comparing the variation ranges corresponding to adjacent pairs to determine a difference; and determining whether the difference is within an allowable error range; and adjust the detection block according to a tracking result.

8. The computer device according to claim 7, wherein the processor is further configured to:
  receive an $(i+M)^{th}$ image frame, M being a positive integer;
  determine whether a subject in the $(i+M)^{th}$ image frame changes relative to the subject in the $i^{th}$ image frame; and
  in response to changing, regenerate a detection block according to the subject detected in the $(i+M)^{th}$ image frame, and re-track the subject in the $(i+M)^{th}$ image frame.

9. The computer device according to claim 7, wherein the processor is further configured to:
  obtain brightness of each subsequent image frame;
  in response to determining that a difference between the brightness of two adjacent image frames is greater than or equal to a first preset threshold, call a kernelized correlation filters tracking algorithm to track the subject according to the location of the subject in the $i^{th}$ image frame; and
  in response to determining that a difference between the brightness of two adjacent image frames is less than the first preset threshold, call an optical flow tracking algorithm to track the subject according to the location of the subject in the $i^{th}$ image frame.

10. The computer device according to claim 7, wherein the processor is further configured to:
  determine whether the location of the subject in one subsequent image frame is different from the location of the subject in the $i^{th}$ image frame;
  in response to determining that the location of the subject in the subsequent image frame is different from the location of the subject in the $i^{th}$ image frame, adjust the detection block according to the location of the subject in the subsequent image frame.

11. The computer device according to claim 7, wherein a plurality of subjects are comprised and a plurality of detection blocks are generated.

12. The computer device according to claim 11, wherein the plurality of subjects have respective unique identification identifiers.

13. A non-transitory computer-readable storage medium, having computer programs stored thereon, wherein when the programs are executed by a processor, the visual search method is implemented, the visual search method comprising:
  receiving an $i^{th}$ image frame, i being a positive integer;
  extracting a location and a classification of a subject in the $i^{th}$ image frame, and generating a detection block corresponding to the subject;
  obtaining an $(i+n)^{th}$ image frame after the $i^{th}$ image frame, where n is a positive integer;
  tracking the subject according to the location of the subject in the $(i+n)^{th}$ image frame;
  obtaining image frames between an $(i+1)^{th}$ image frame and an $(i+n-1)^{th}$ image frame as reference image frames;
  verifying the tracking of the subject according to the reference image frames, comprising:
    for each pair of two adjacent reference image frames, determining a variation range of the location of the subject between the two adjacent reference image frames; comparing the variation ranges corresponding to adjacent pairs to determine a difference; and determining whether the difference is within an allowable error range; and
  adjusting the detection block according to a tracking result.

14. The non-transitory computer-readable storage medium according to claim 13, wherein the method further comprises:
  receiving an $(i+M)^{th}$ image frame, M being a positive integer;
  determining whether a subject in the $(i+M)^{th}$ image frame changes relative to the subject in the $i^{th}$ image frame; and
  in response to changing, regenerating a detection block according to the subject detected in the $(i+M)^{th}$ image frame, and re-tracking the subject in the $(i+M)^{th}$ image frame.

* * * * *